Figure 1A:
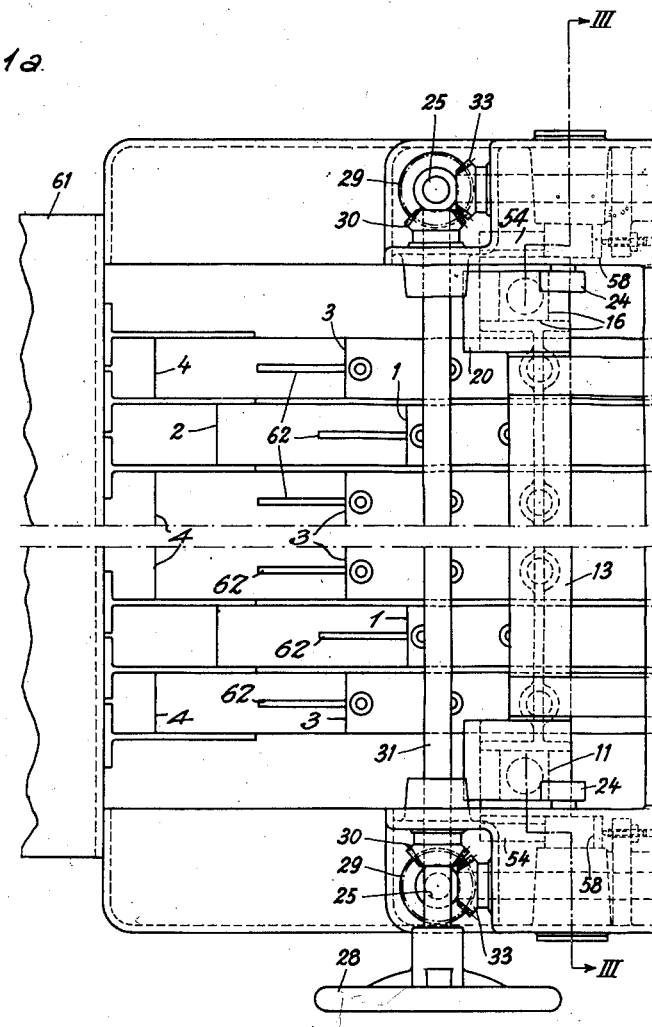

July 7, 1942.   G. MAURER   2,289,022
CONVEYING DEVICE
Filed June 12, 1940    9 Sheets-Sheet 1

Inventor
Gottfried Maurer
by Young Emery + Thompson
Attys.

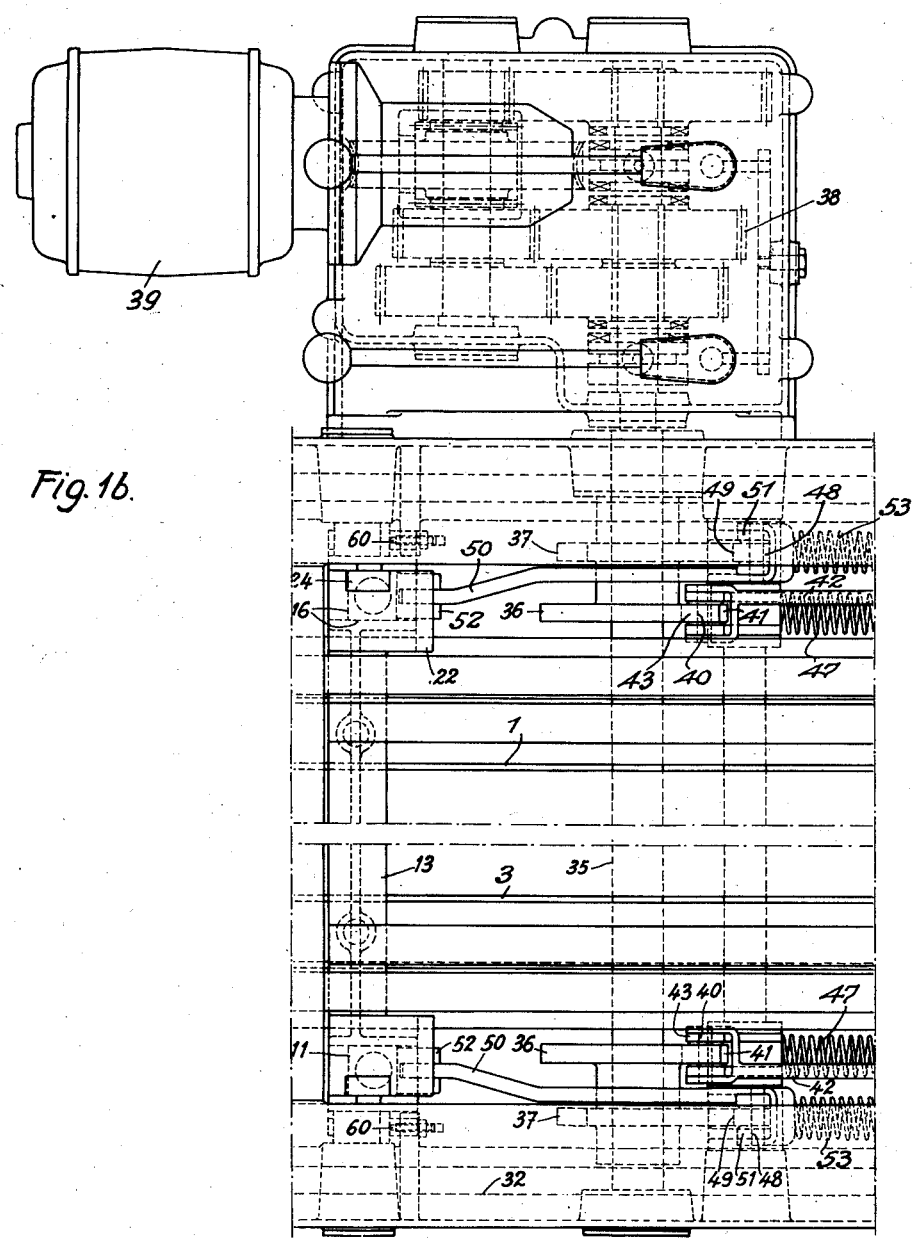

July 7, 1942.  G. MAURER  2,289,022
CONVEYING DEVICE
Filed June 12, 1940   9 Sheets-Sheet 3
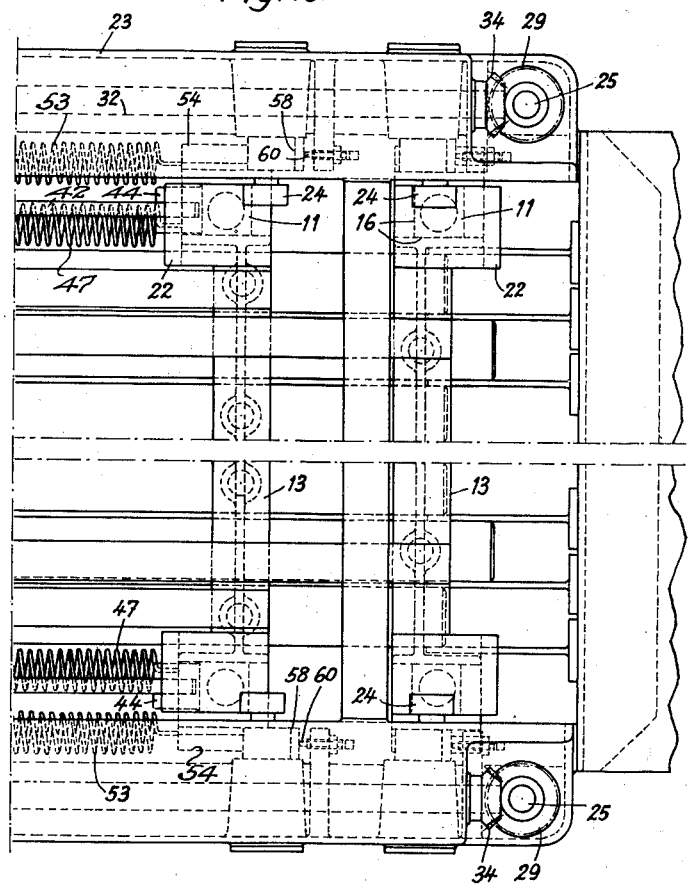

July 7, 1942.　　　　　G. MAURER　　　　　2,289,022
CONVEYING DEVICE
Filed June 12, 1940　　　　9 Sheets-Sheet 5

Inventor
Gottfried Maurer
by Young, Emery & Thompson
Attys.

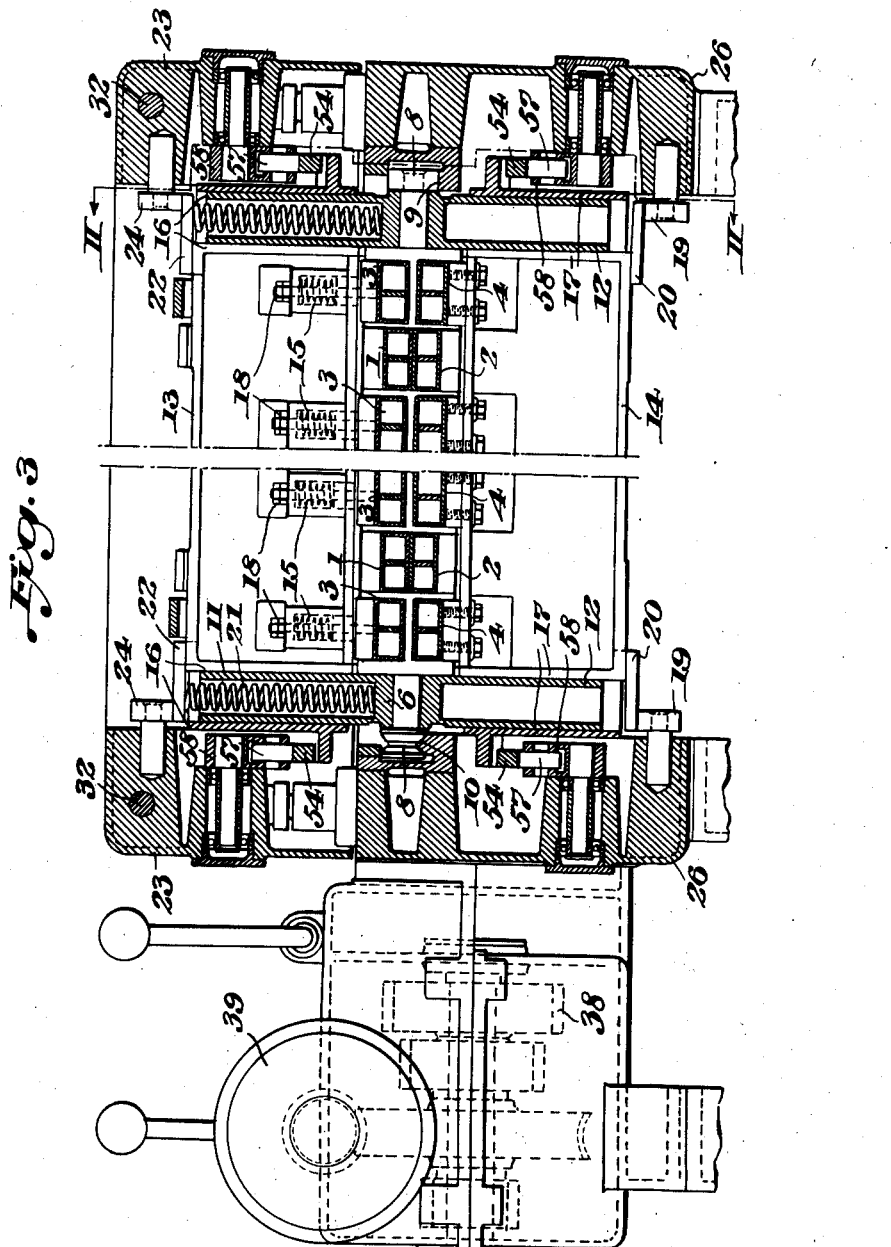

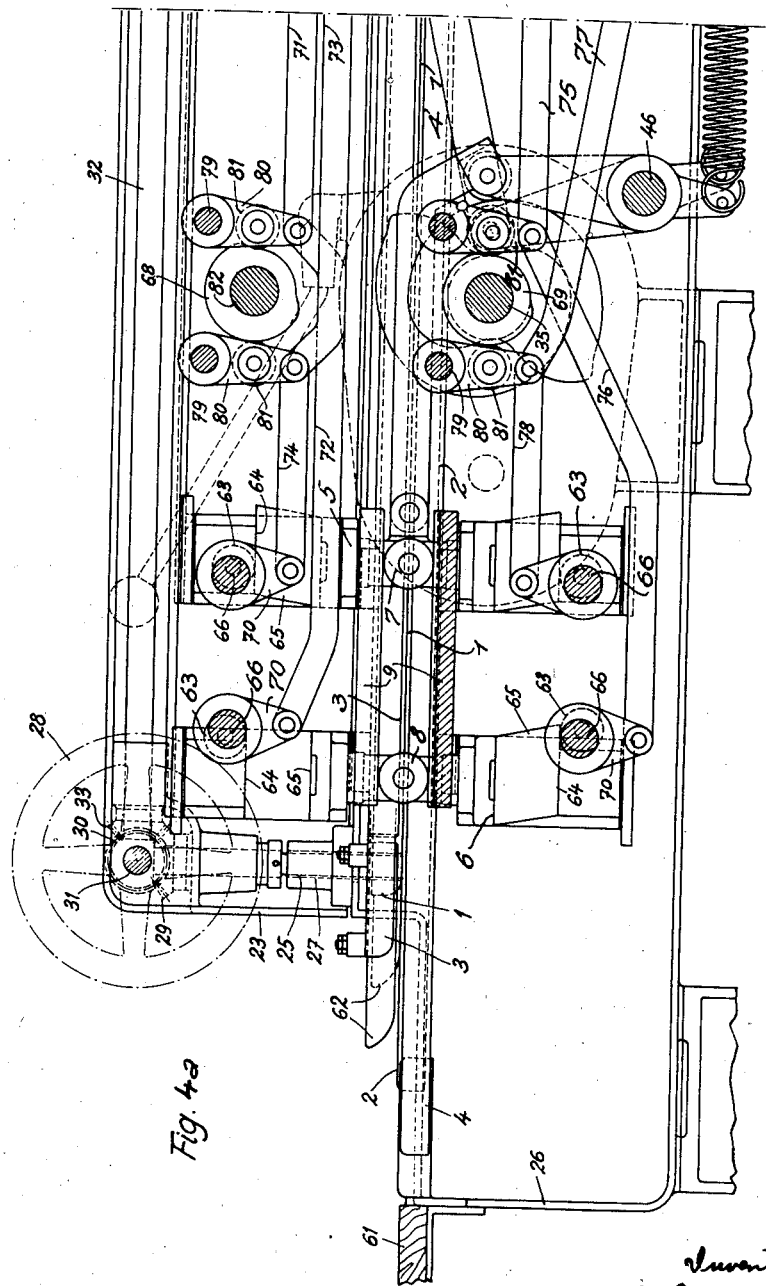

July 7, 1942.　　　　G. MAURER　　　　2,289,022
CONVEYING DEVICE
Filed June 12, 1940　　　　9 Sheets-Sheet 9
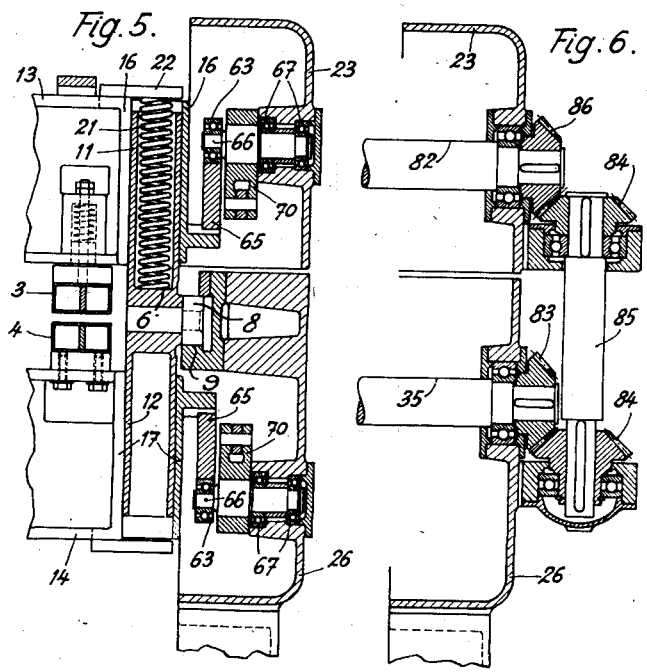
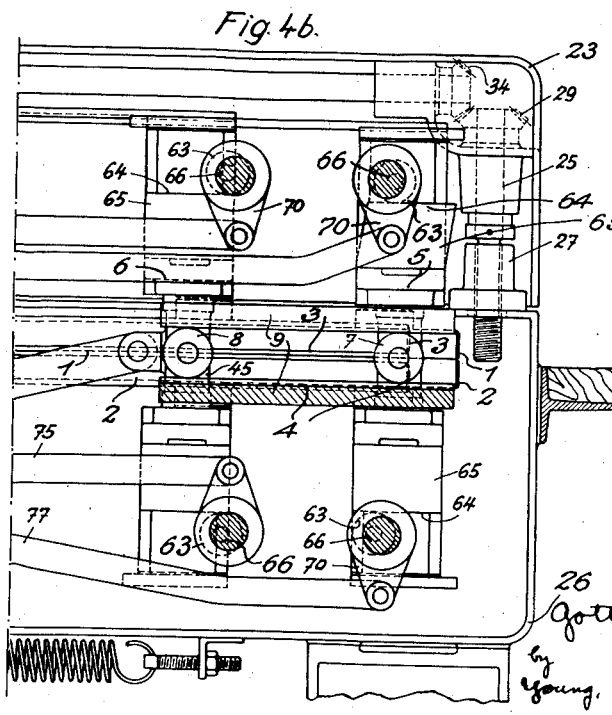

Patented July 7, 1942

2,289,022

UNITED STATES PATENT OFFICE 2,289,022

CONVEYING DEVICE

Gottfried Maurer, Zurich, Switzerland, assignor to Muller & Cie, Aktiengesellschaft, Maschinenfabrik, Brugg, Switzerland, a joint-stock company of Switzerland Application June 12, 1940, Serial No. 340,297
In Switzerland April 11, 1940

9 Claims. (Cl. 198—219)

The present invention relates principally to conveying devices, and particularly to devices in which two beds comprising a number of bars are provided and wherein each of said bars is adapted to move to and fro.

One of the objects of the present invention is to provide a device in which a drive mechanism is provided adapted to move the bars at the beginning of their forward motion at a greater and afterwards at a lower speed. This apparatus is specially, but not exclusively, used as a gluing machine, particularly as a veneer gluer.

The veneer gluers heretofore proposed have no movable members pressing the goods such as the bars in my pending applications Nos. 309,099, 356,090/1, but immovable pressing elements between which the goods to be glued move. In these known gluers said motion is imparted to the goods by feed rollers provided at the inlet end of the machine. These feed rollers thus shove the goods through between the braking pressing elements. This manner of moving the work pieces has various disadvantages and results in a great number of damaged veneers. These latter are liable to become warped and broken between the feed rollers and the pressing elements. In the known devices the veneers to be glued together often become displaced with regard to one another, so that the setting of the glue is impaired.

My invention remedies these disadvantages. In my apparatus the veneers are not shoved through between the pressing elements by a driving means but they are taken along by the pressing elements, i. e., the bars themselves.

Another object of the invention is to provide a gluing machine with the bars arranged in groups adapted to be moved to and fro by a driving mechanism in such a way that one group which, on the quicker forward motion of another group, moves forward at a lower speed, maintains this lower speed for a certain time after the other group has begun to move forward at a lower speed.

Another object of my invention is to arrange the bars on supporting frames mounted on carriages adapted to move to and fro, the supporting frames being capable of a vertical movement controlled by special means while the carriages move to and fro.

Further objects and features will be apparent as the following description proceeds, reference being had to the accompanying drawings in which—

Figure 2A:
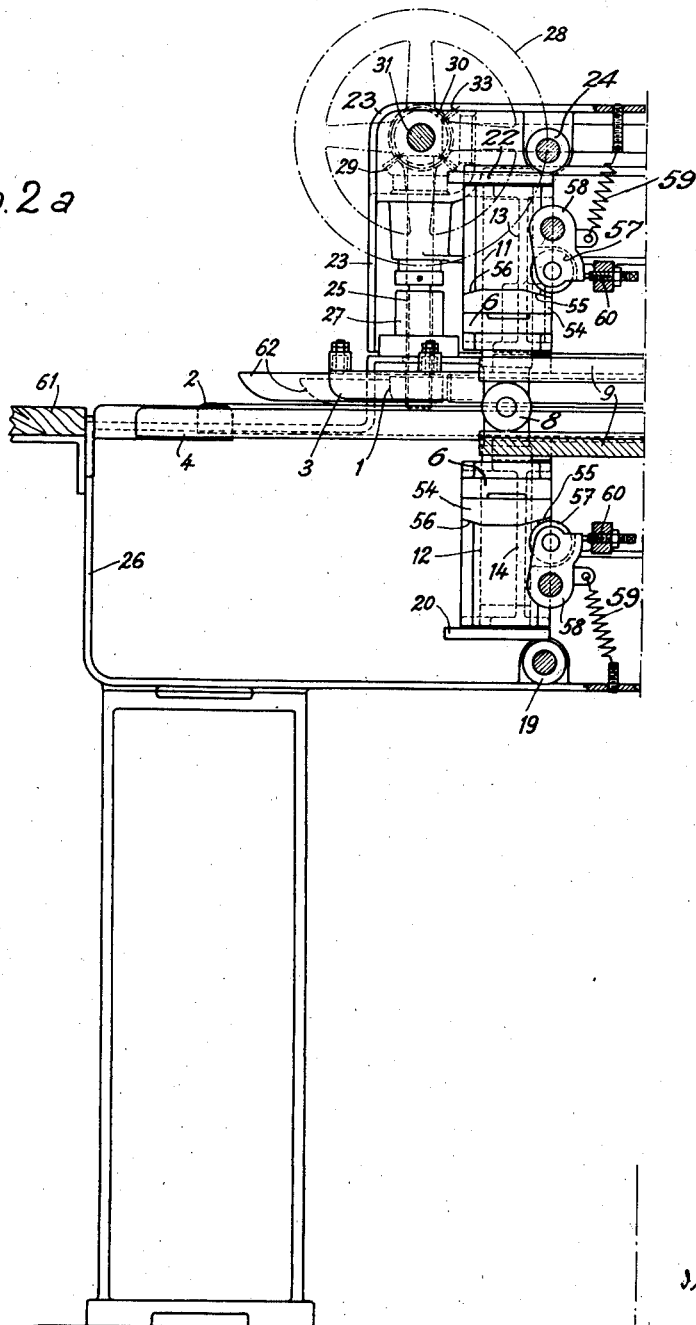
Figure 2B:
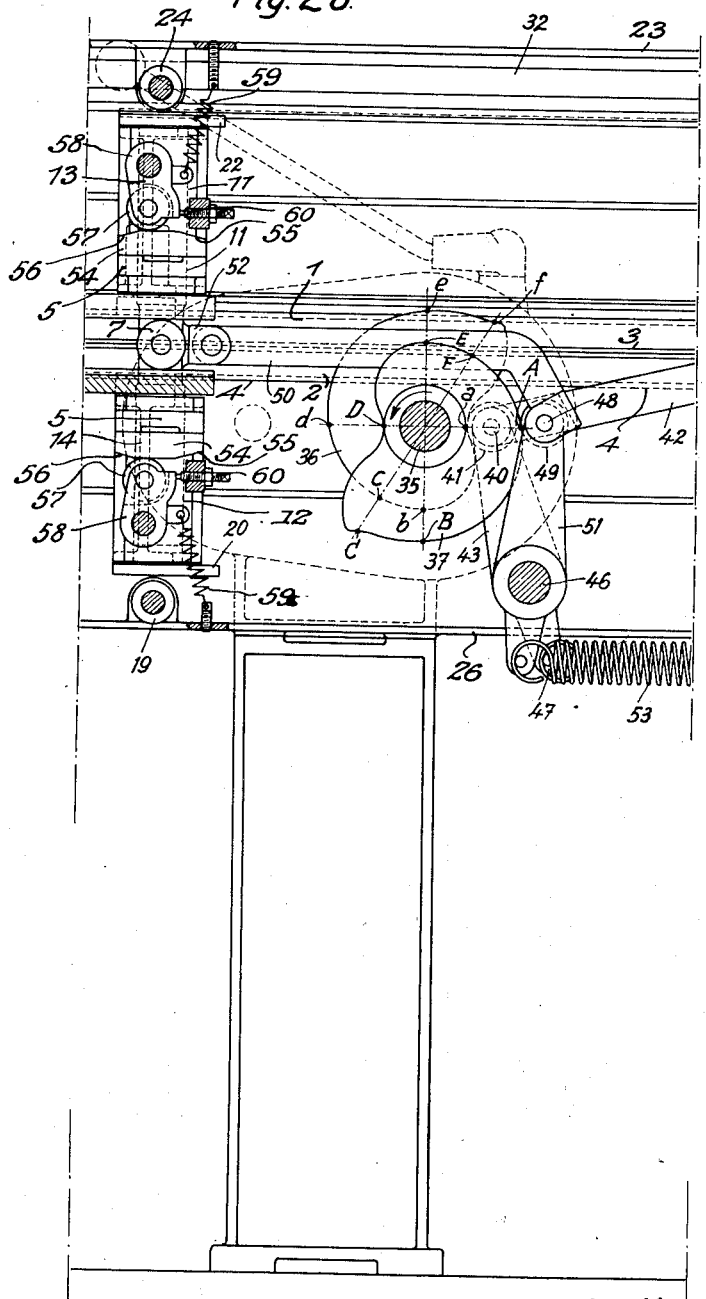
Figure 2C:
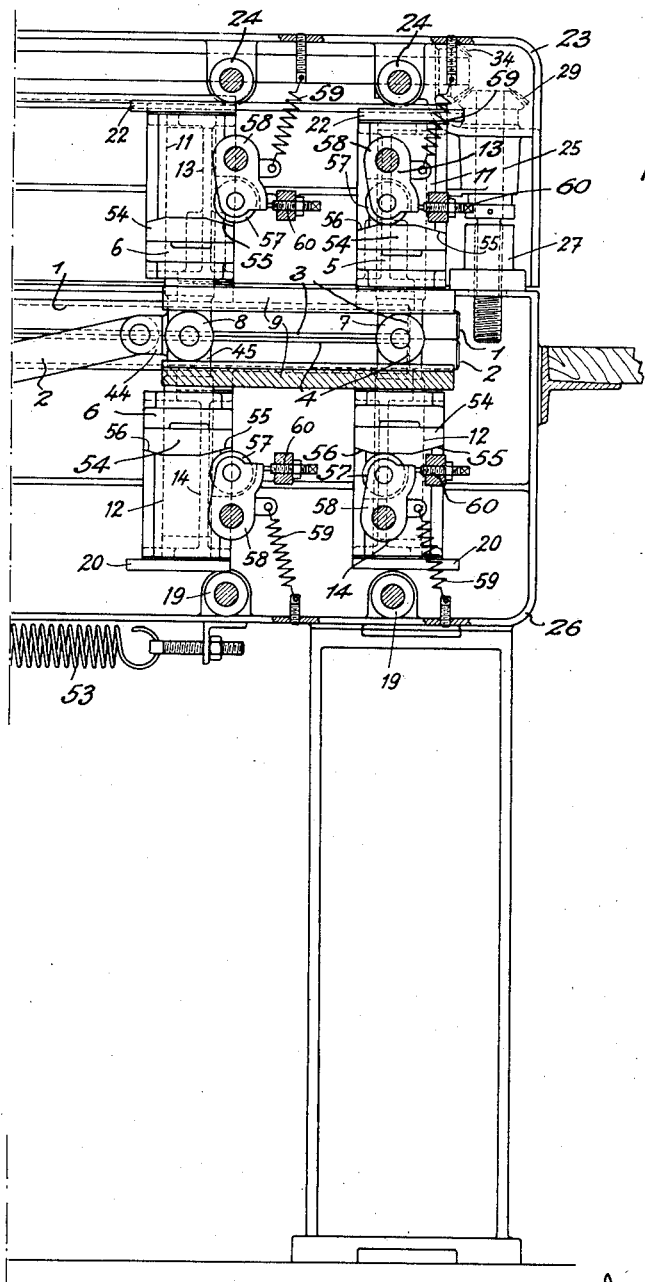

Figs. 1a, 1b, 1c are parts of a plan view of a first embodiment,

Figs. 2a, 2b and 2c are parts of a longitudinal section taken on line II—II of Fig. 3, Fig. 3 is a cross section, taken on line III—III of Fig. 1a, Figs. 4a and 4b are parts of a longitudinal section similar to that in Figs. 2a, b, c, but of a second embodiment, Fig. 5 is a part of a cross section similar to that in Fig. 3, but of the second embodiment, Fig. 6 is a part of a cross section, illustrating a detail of the second embodiment.

The machines shown in the drawings have two groups of bars. One group consists of the upper and lower bars 1, 2 respectively and the other of the upper and lower bars 3, 4 respectively. The upper and lower bars 1 and 2 of the one group are mounted on a carriage 5 and the bars 3 and 4 of the other group on a carriage 6, each of these carriages 5 and 6 being longitudinally movable. Carriage 5 is provided with four rollers 7 and carriage 6 with four rollers 8. These rollers run on rails 9 and 10 arranged on the machine frame. The left hand rollers (Fig. 3) of both carriages are profiled rollers running on the correspondingly shaped rails 10, while the right hand rollers have cylindrical bearing surfaces and run on the flat rails 9. Each of the two carriages has four upper and lower columns 11 and 12. The upper and lower supporting frames 13 and 14 are slidably mounted on these upper and lower columns 11 and 12 of each carriage by means of the guides 16 and 17 (Figs. 3 and 5). To the one supporting frame 13 the bars 1 and to the other supporting frame 13 the bars 3 are attached, while the bars 2 are fixed to the one supporting frame 14 and the bars 4 to the other supporting frame 14. Fig. 3 illustrates a section through the carriage 6 of the group comprising the bars 3, 4. As may be seen from this Fig. 3 the bars 3 are resiliently fixed to the upper supporting frame 13 by means of the springs 15 and the bolts 18, while the lower bars 4 are rigidly connected with the lower supporting frame 14. The upper and lower supporting frames of each group with the corresponding bars have a constant tendency to recede from each other. Owing to its weight the lower supporting frame 14 is urged to move downwardly, which downward motion is limited by the stop rollers 19 attached to the machine frame. However, under the influence of the helical springs 21, the upper supporting frame 13 of each carriage is urged to move upwardly.

These springs 21 are located in the hollow upper columns 11 of the carriage. At one end they bear against the bottom of these columns and at the other end against the upper plates 22 fixed to the supporting frames 13. Stop rollers 24 are mounted on the upper part 23 of the machine frame; the plates 22, when the frames 13 have reached their uppermost position, strike against these stop rollers 24.

The part 23 of the machine frame is movable vertically, so that the distance between the upper and the lower beds of bars can be adapted to the thickness of the goods to be conveyed. This part 23, therefore, rests on the spindles 25, whose lower portions are provided with threads engaging female threads in sockets 27 fixed to the immovable part 26 of the machine frame. These spindles may be driven with the help of a hand wheel 28 through bevel wheels. Each spindle carries a bevel wheel 29. The two left hand spindles 25 (Fig. 1a) are operated by means of the bevel wheels 30 mounted, together with the hand wheel 28, on the shaft 31. This shaft 31 is mounted on the upper part 23 of the machine frame. On this upper part 23 two intermediate shafts 32 are located, transmitting the motion of the hand wheel to the right hand spindles 25 (Fig. 1c). The bevel wheels 33 on these shafts 32 engage the bevel wheels 29 of the left hand spindles 25 and the bevel wheels 34 cooperate with the wheels 29 of the right hand spindles 25 (Figs. 1a and 1c).

In the first place, the following statement describes the drive for the forward and backward motion of the bar groups. For the purpose of producing this motion two pairs of cam discs 36, 37 are fixed to a common shaft 35. This latter is driven by a motor 39 with the aid of a change gear 38. The one pair of cam discs, 36, serves for the reciprocating moving of the carriage 6 comprising the bars 3 and 4, and the other pair, 37, for the moving of the carriage 5 comprising the bars 1 and 2. The rods 42 and levers 43 are pivotally fixed to the bolts 40 carrying the rollers 41 which cooperate with the cam discs 36. At the other end, the rods 42 are pivotally mounted on the lugs 44 of the part 45 between the columns 11 and 12 of the carriage 6. The levers 43 are rockers placed on the shaft 46. They are under the effect of the springs 47 fixed at the one end, to these rockers, and at the other end, to a stationary point of the machine. These springs 47 continuously press the rollers 41 against the cam discs 36. The rods 50 and the levers 51 are pivotally fixed to the bolt 48 carrying the rollers 49 which cooperate with the cam discs 37. The cranked rods 50, at the other end, are pivotally mounted on the lugs 52 of the carriage 5. The levers 51 are rockers placed on the shaft 46. They are under the effect of the springs 53 which, similar to the springs 47 are, at the one end, fixed to these rockers 51 and, at the other end, to a stationary point of the machine. These springs 53 continuously press the rollers 49 against the cam discs 37.

It may easily be understood that, on rotation of the shaft 35, the rod 42 moves the carriage 6 comprising the bars 3 and 4, and the rod 50 moves the carriage 5 comprising the bars 1 and 2 to and fro. The speed at which these carriages move, will be described later on.

The mechanism for the vertical motion of the bars is described as follows: As already mentioned, the upper and lower supporting frames 13 and 14 carrying the bars of the single groups have a tendency to recede from each other. Thus it follows that, for producing the desired vertical motion of the bars, means must be provided to counteract this tendency. For this purpose, in the embodiment shown in Figs. 1a to 1c, 2a to 2c and 3 the blocks 54 are fixed to the upper and lower supporting frames 13 and 14, which blocks have inclined ascents 55, 56 forming part of the control surfaces cooperating with the control rollers 57. These rollers 57 are carried by the rocking levers 58 mounted on the machine frame. These levers 58 are under the effect of the return springs 59 which continuously try to move the levers 58 toward the stops 60 fixed to the machine frame. Be it supposed that the carriage 6 comprising the bars 3 and 4, seen in Fig. 3, moves to the right. The rocking levers 58 belonging to this carriage bear against the stops 60 under the effect of the springs 59. As soon as, on the right hand motion of the carriage 6 carrying the bars 3 and 4, the ascents 55 engage the rollers 57, the upper supporting frame 13 carrying the bars 3 is, contrary to the effect of the springs 21 (Fig. 2), moved downwardly, and the lower supporting frame 14 is, contrary to the effect of its weight, moved upwardly. The upper and lower bars 3, 4 respectively of the carriage 6 approach one another. The incline of the ascents 55 may be chosen so that, at one time, the bars approach one another equally over their whole length or unequally, for instance, quicker at the inlet (at the left of Fig. 2a) and slower at the outlet end (at the right in Fig. 2c). When the carriage 6 with its bars 3 and 4 has finished its right hand motion, its blocks 54, seen in Figs. 2a and 2c are on the right of the corresponding rollers 57. When the left hand motion of the carriage 6 begins, the levers 58, on the ascents 56 striking the rollers 57 of the carriage 6, are moved away from the stops 60 contrary to the effect of the springs 59. However, at the moment, when the outermost left hand position (Fig. 2a) of the carriage 6 is reached, the rocking levers 58, under the effect of the return springs 59, return to the position shown for the carriage 6 comprising the bars 3 and 4 in Figs. 2a, b, c.

The manner in which the carriage 5 with the bars 1 and 2 and the carriage 6 comprising the bars 3 and 4 move forward and backward will be described in the following statement, reference being had to Figs. 2a, b, c. The shaft 35 rotates in a counterclockwise direction (see arrow). As may be seen from the position of the rollers 41 and 49 relative to their cam discs, the carriage 6 comprising the bars 3 and 4 is in its left hand return position, while the carriage 5 comprising the bars 1 and 2 moves forward (to the right) at a constant speed. From the mutual position of the blocks 54 and the rollers 57 is may be seen that the bar group 3, 4 of the carriage 6 is open, while the group 1, 2 of the carriage 5, however, is closed. The carriage 6 and with it the bars 3, 4 now begins the right hand motion at a great speed and this until the rollers 41 make contact with the cam discs 36 at the point b, because the curves of these cam discs are steep between the points a and b. During this period the group of bars 3, 4 mounted on the carriage 6 is closed because the ascents 55 mount on to the rollers 57. From the point b onward the carriage 6 with the bars 3, 4 moves at a lower speed, owing to the fact that the curves of the cam discs 36 now ascend but slightly. The carriage 6 i. e. the bars 3, 4 having moved quickly according to the curve ab, the carriage 5 i. e. the bars 1, 2 have moved forward at a low speed according to the curve AB of the discs 37. Between the points b, c and B, C the two groups of bars move forward at the same speed. While, from point c the carriage 6 continues to move forward at a low speed and with closed bar group 3, 4, the carriage 5 with its bars 1, 2 after the point C, under the effect of the springs 53, moves at a great speed to its left hand return position corresponding to the point D of the cam discs 37. Shortly before the point C, that is, at the last moments of the right hand motion of the carriage 5 carrying the bars 1, 2, the ascents 56 of the blocks 54 have descended the rollers 57, the bar group 1, 2 of the carriage 5 is thus opened before it is in the right hand return position. From the point D, d the same motions and speeds recur as from the points a, A, the rôles of the cam discs being, however, changed. From D to E the carriage 5 now moves to the right at a great speed, while the group of bars 1, 2, belonging to it, is closed. From E to F and e to f both carriages i. e. all the bars 1, 2, 3, 4 move forward (i. e. to the right) together at a low speed and with closed bar groups until, shortly before f, the bar group 3, 4 of the carriage 6 is opened and the carriage 6 with the bars 3, 4, after the point f has been passed, runs quickly to the left under the effect of the springs 47.

The incline of the ascents 55 and 56 may be chosen so that the pressure exerted on the goods to be conveyed may, at any movement of the forward motion, attain the values suitable for treating the goods.

In the embodiment shown in Figs. 4a, 4b, 5 and 6 nothing but the vertical motion is produced by other means than in the first embodiment, all other parts of the machine remain unchanged and are designated by the same reference characters as before.

In place of the blocks with the ascents 55, 56 (Figs. 2a, b c) adapted to ascend the rollers 57 on the rocking levers 58, control rollers 63, eccentrically mounted, are provided, cooperating with the horizontal surfaces 64 of the blocks 65 fixed to the supporting frames 13, 14 of the carriage 5 with the bars 1, 2 and the carriage 6 with the bars 3, 4. These control rollers 63 are carried by the eccentric pins 66 which, in their turn, are placed on the ball bearings 67 attached to the machine frame (Fig. 5). In order to move the supporting frames 13, 14 vertically, the eccentric pins 66 are rotated, whereby the control rollers 63 either close or open the bar groups, since the rollers 63 either approach the supporting frames 13, 14 to each other or allow them to recede from one another. The eccentric pins 66 are driven by the cam discs 68, 69. For this purpose the levers 70 are fastened to the eccentric pins 66. The levers 80 pivotally mounted on the shafts 79 are pivotally connected with the corresponding levers 70 by means of the rods 71, 72, 73, 74, 75, 76, 77, 78. The levers 80 carry rollers 81 cooperating with the cam discs 68, 69. Springs continuously pressing the rollers 81 against the cam discs may be omitted, for the eccentric pins 66, on the upper supporting frame 13, are always in such a position with regard to the axis of their bearings, that the blocks 65 transmit the pressure exerted by the springs 21, in such a way to the control rollers 63 that the rollers 81 are constantly applied to the cam discs 68. In a like manner the eccentric pins 66 for the lower supporting frames 14 are always in such a position, that the weight of the supporting frames 14 provides for the rollers 81 being constantly pressed against the cam discs 69. Furthermore, the stop rollers 19, 24 of the first embodiment may be omitted, because the control rollers 63 simultaneously serve as a stopping means for the vertical motion of the supporting frames. The cam discs 69 for the lower supporting frames 14 are mounted on the same shaft 35 as the cam discs 36, 37 for the forward and backward motion. One, two or more of these discs 69 might be provided. The cam discs 68 for the upper supporting frames 13 are arranged on a shaft 82 parallel to the shaft 35. Shaft 82 is driven by shaft 35 through the bevel gear illustrated in Fig. 6. The motion of the shaft 35 is transmitted to the shaft 82 by means of the bevel wheels 84 on the vertical shaft 85 in that these wheels engage the bevel wheels 83, 86 of the shafts 35, 82. There may be one, two or more cam discs 68 on the shaft 82. The position of the eccentric pins 66 may be chosen so that, at one time, the bars approach one another either equally or unequally over their whole length.

Ledges 62 are provided on the upper bars at the inlet end of the machine. On feeding the goods to be glued from the service table 61 (Fig. 2a) they are seized by the ledges 62 and the lower bars of the same group moving at a high speed at the beginning of the right hand motion and are thus introduced between the two beds of bars.

Instead of the upper and the lower supporting frames, the lower ones only might be vertically movable.

As may be seen from Fig. 3 the bars are hollow in order to allow a heating medium to flow through the bars.

While these embodiments of the invention have been illustrated and described in such detail as to enable any one skilled in the art to practice the invention, nevertheless it is to be understood that the invention is not to be limited to any of the details disclosed, but, instead, it will be understood that the invention embraces such embodiments of the broad idea as fall within the scope of the subjoined claims, it being obvious that various changes may be made without departing from the spirit of the invention.

What I claim is:

1. In a conveying device, a frame, two conveying beds with an adjustable perpendicular distance from each other, each of said beds comprising a number of bars lying side by side, the bars of both beds being arranged in groups, guides on said frame, carriages adapted to move to and fro along said guides, other guides on said carriages, lower and upper supporting frames mounted on said carriages and free to move vertically along said other guides, the supporting frames of the same carriage carrying the bars of one group, a drive mechanism adapted to move said carriages at the beginning of their forward motion at a greater and afterwards at a lower speed, and control means adapted to control the vertical movement of said supporting frames on said carriages moving to and fro.

2. In a conveying device, two conveying beds with an adjustable perpendicular distance from each other, each of said beds comprising a number of bars lying side by side, the bars of both beds being arranged in groups, carriages adapted to move to and fro, lower and upper supporting frames mounted on said carriages and free to move vertically, the supporting frames of the same carriage carrying the bars of one group, a drive mechanism adapted to move the carriages to and fro, control surfaces on said supporting frames, and control rollers adapted to move said supporting frames vertically by cooperating with said control surfaces.

3. In a conveying device, two conveying beds with an adjustable perpendicular distance from each other, each of said beds comprising a number of bars lying side by side, the bars of both beds being arranged in groups, carriages adapted to move to and fro, lower and upper supporting frames mounted on said carriages and free to move vertically, the supporting frames of the same carriage carrying the bars of one group, a drive mechanism adapted to move the carriages to and fro, control surfaces on said supporting frames, control rollers adapted to move said supporting frames vertically by cooperating with said control surfaces, rocking levers carrying said control rollers, stops, springs adapted to press said rocking levers against said stops, said rocking levers on the return motion being adapted to be removed from said stops against the effect of said springs.

4. In a conveying device, two conveying beds with an adjustable perpendicular distance from each other, each of said beds comprising a number of bars lying side by side, the bars of both beds being arranged in groups, carriages adapted to move to and fro, lower and upper supporting frames mounted on said carriages and free to move vertically, the supporting frames of the same carriage carrying the bars of one group, a drive mechanism adapted to move the carriages to and fro, a main frame, control rollers, pins eccentrically pivoted on said main frame and carrying said control-rollers, surfaces on said supporting frames adapted to cooperate with said control rollers, and driving means adapted to rotate said pins in order to move said supporting frames vertically.

5. In a conveying device, two conveying beds with an adjustable perpendicular distance from each other, each of said beds comprising a number of bars lying side by side, the bars of both beds being arranged in groups, carriages adapted to move to and fro, lower and upper supporting frames mounted on said carriages and free to move vertically, the supporting frames of the same carriage carrying the bars of one group, cam discs adapted to move the carriages at the beginning of their forward motion at a greater and afterwards at a lower speed, control surfaces on said supporting frames, and control rollers adapted to move said supporting frames vertically by cooperating with said control surfaces.

6. In a conveying device, two conveying beds with an adjustable perpendicular distance from each other, each of said beds comprising a number of bars lying side by side, the bars of both beds being arranged in groups, carriages adapted to move to and fro, lower and upper supporting frames mounted on said carriages and free to move vertically, the supporting frames of the same carriage carrying the bars of one group, cam discs adapted to move the carriages at the beginning of their forward motion at a greater and afterwards at a lower speed, a main frame, control rollers, pins eccentrically pivoted on said main frame and carrying said control rollers, surfaces on said supporting frames adapted to cooperate with said control rollers, and further cam discs adapted to rotate said pins in order to move said supporting frames vertically.

7. In a device for conveying and pressing strips together, pairs of bars, longitudinally reciprocable in the direction of conveying, each pair comprising laterally spaced bars displaceable laterally toward and away from each other during their longitudinal reciprocatory movement to grip and release strips to be conveyed, driving mechanism including a means for moving a first of said pairs of bars at the beginning of its conveying motion longitudinally at a greater speed and later at a slower speed, a separate means for moving a second of said pairs of bars at the beginning of its conveying motion and on the slower conveying motion of said first pair longitudinally at a greater speed in order to bring a newly gripped strip in contact with and to press it against the hindmost of other strips already in close contact with one another and gripped and conveyed by said first pair moving at a slower speed, and for moving said second pair later and on the return motion and on the following quicker conveying motion of said first pair at a slower speed rectilinearly in order to convey the strips in close contact with one another towards the outlet end of the machine, a first device operable to separate the bars of the first pair at the end of its conveying movement and on the slower rectilinear conveying movement of said second pair, to bring the trailing ends of the bars of said first pair together at the beginning of the following conveying movement of this first pair and during the slower rectilinear conveying movement of said second pair in order to grip a new strip, while the leading ends of the bars of said first pair remain spaced at the beginning of the conveying movement of said first pair, to bring the leading ends of the bars of said first pair together during the conveying movement of said first pair and the slower conveying movement of said second pair, and a second device operable to separate the bars of the second pair at the end of its conveying movement and on the slower rectilinear conveying movement of said first pair to bring the trailing ends of the bars of said second pair together at the beginning of the following conveying movement of this second pair and during the slower rectilinear conveying movement of said first pair in order to grip a new strip, while the leading ends of the bars of said second pair remain spaced at the beginning of the conveying movement of said second pair, to bring the leading ends of the bars of said second pair together during the conveying movement of said second pair and the slower conveying movement of said first pair.

8. In a device for conveying and pressing strips together, pairs of bars, longitudinally reciprocable in the direction of conveying, each pair comprising two laterally spaced bars displaceable laterally toward and away from each other during their longitudinal reciprocatory movement to grip and release strips to be conveyed, driving mechanism including a first cam disc for moving a first of said pairs of bars at the beginning of its conveying motion longitudinally at a greater speed and later at a slower speed, a second cam disc for moving a second of said pairs of bars at the beginning of its conveying motion and on the slower conveying motion of said first pair longitudinally at a greater speed in order to bring a newly gripped strip in contact with and to press it against the hindmost of other strips already in close contact with one another and gripped and conveyed by said first pair moving at a slower speed, and for moving said second pair later and on the return motion and on the following quicker conveying motion of said first pair at a slower speed rectilinearly in order to convey the strips in close contact with one another towards the outlet end of the machine, a first device operable to separate the bars of the first pair at the end of its conveying movement and on the slower rectilinear conveying movement of said second pair, to bring the trailing ends of the bars of said first pair together at the beginning of the following conveying movement of this first pair and during the slower rectilinear conveying movement of said second pair in order to grip a new strip while the leading ends of the bars of said first pair remain spaced at the beginning of the conveying movement of said first pair, to bring the leading ends of the bars of said first pair together during the conveying movement of said first pair and the slower conveying movement of said second pair, and a second device operable to separate the bars of said second pair at the end of its conveying movement and on the slower rectilinear conveying movement of said first pair, to bring the trailing ends of the bars of said second pair together at the beginning of the following conveying movement of this second pair and during the slower rectilinear conveying movement of said first pair in order to grip a new strip, while the leading ends of the bars of said second pair remain spaced at the beginning of the conveying movement of said second pair, to bring the leading ends of the bars of said second pair together during the conveying movement of said second pair and the slower conveying movement of said first pair.

9. In a device for conveying and pressing strips together, two conveying beds with an adjustable perpendicular distance from each other, each of said beds comprising a number of laterally spaced bars, the bars of both beds being arranged in groups, carriages longitudinally reciprocable in the direction of conveying, lower and upper supporting frames mounted on said carriages and free to move vertically, the supporting frames of the same carriage carrying the bars of one group, driving mechanism including a means for moving the first of said carriages at the beginning of its conveying motion longitudinally at a greater speed and later at a slower speed, a separate means for moving the other of said carriages at the beginning of its conveying motion and on the slower conveying motion of said first carriage longitudinally at a greater speed in order to bring a strip newly gripped by the bars on the supporting frames of said other carriage in contact with and to press it against the hindmost of other strips already in close contact with one another and gripped and conveyed by the bars on the supporting frames of said first carriage moving at a slower speed, and for moving said other carriage later and on the return motion and the following quicker conveying motion of said first carriage at a slower speed rectilinearly in order to convey the strips in close contact with one another towards the outlet end of the machine, a first device operable to separate the supporting frames of said first carriage in order to separate the bars on them at the end of their conveying movement and on the slower rectilinear conveying movement of said second carriage in order to grip a new strip, while the leading ends of the bars on the supporting frames of said first carriage remain spaced at the beginning of the conveying movement of said first carriage, to bring the leading ends of the bars on the supporting frames of said first carriage together during the conveying movement of said first carriage and the slower conveying movement of said second carriage, and a second device operable to separate the supporting frames of said second carriage in order to separate the bars on them at the end of their conveying movement and on the slower rectilinear conveying movement of said first carriage, to bring the trailing ends of the bars on the supporting frames of said second carriage together at the beginning of the following conveying movement of this second carriage and during the slower rectilinear conveying movement of said first carriage in order to grip a new strip, while the leading ends of the bars on the supporting frames of the second carriage remain spaced at the beginning of the conveying movement of said second carriage, to bring the leading ends of the bars on the supporting frames of said second carriage together during the conveying movement of said second carriage and the slower conveying movement of said first carriage.

GOTTFRIED MAURER.